Patented Sept. 19, 1944

2,358,598

UNITED STATES PATENT OFFICE 2,358,598

FOOD PREPARATION

Robert P. Scherer, Detroit, Mich., assignor, by mesne assignments, to Gelatin Products Corporation, Detroit, Mich., a corporation of Michigan No Drawing. Application September 25, 1940, Serial No. 358,295

1 Claim. (Cl. 99—124)

This invention relates to improvements in food preparations and particularly to an improved concentrated food product for the making of soup.

An object is to provide in concentrated and inexpensive form an improved soup stock product which, upon addition to water or other aqueous solution will furnish the essentials for the making of soup and which product is so made as to preserve its various contained ingredients against deterioration and contamination.

Soup stock is known in cookery as a liquid or jellylike material which contains the juices and soluble parts of meats, vegetables, and the like extracted by cooking. Soup stock may be used alone as a soup but it is commonly prepared and stored in concentrated form and to it is added water or other liquids and various other ingredients such as meats, fats, vegetables, fruits, bakery products, seasonings, et cetera, when it is desired for use. Hereinafter throughout the specification and claims the term "stock or soup stock" is intended to cover a soup stock to which may have been added such other ingredients in such variety and number as desired.

This improved food product is so formed that the ingredients which are subject to deterioration upon exposure to the atmosphere are protected therefrom by an ingredient which does not so deteriorate and which is used as an envelope or covering for the other ingredients.

Gelatin is an important ingredient of soup stock made from meat products or including such. It may be added to vegetable stock. It gives body to the soup. I propose to use this important ingredient as a protective envelope for the other ingredients. I propose to capsulate soup stock within a gelatin shell. I further propose to employ a gelatin capsule container for the other ingredients wherein the wall structure of the capsule will have a thickness sufficient to furnish in whole or in additional part the gelatin content required for the particular soup to be made from the capsulated stock.

The merchandising of concentrated soup stock products is not new. Essences, extracts, concentrated juices, powders, and soup tablets such as bouillon cubes of various meat products, have been on the market for many years. When used alone in water their range of use is limited. In order that soup prepared from these concentrated products may more nearly resemble soup prepared directly from natural food products it is common practice to add various natural food ingredients thereto to improve or diversify the character of the soup produced.

Concentrated preparations for forming such have also been marketed in air-tight containers such as bottles. Such containers, however, add appreciably to the cost of the product and necessitate prompt use of contents upon opening of the container and exposure of the contents to the atmosphere. Furthermore, these preparations may or may not contain all the required essentials for the particular soup to be produced and they frequently do contain substantial amounts of water.

I propose to provide a soup stock which may contain all the essential ingredients in the required amount with the absence of the gelatin. I propose to capsulate this stock within the gelatin shell. This stock itself is substantially anhydrous, by which I mean its free water content is sufficiently low so that it will not injuriously attack the gelatin shell. This product upon addition to an aqueous solution such as water, milk, or the like, will furnish all the essential ingredients for the making of soup though it is obvious that the user might add to the ingredients if desired.

These soup stock capsules may be manufactured according to any suitable capsulation process. The method disclosed in my patent, No. 1,970,396, may be employed. Its application to this use is apparent. The capsules may be of a size for a single individual serving of soup or may be of sufficient size to serve a family of several people. The shell thickness can be easily regulated by controlling the thickness of the gelatin sheets used in the capsule shell formation. Such capsules might be provided for the preparation of hot or cold soups, thick or clear soups, purées, cream soups, veloutes, bisques, or salad, jelly or aspic rings or wherever the soup gelatin combination base is desired for use to produce an ultimate food product.

What I claim:

A food preparation comprising soup stock, and an edible gelatin shell enclosing and hermetically sealing the soup stock from the air, said shell being of such thickness as will support and protect the soup stock for shipment and storage, and furnish adequate gelatin content when liquid is added to the preparation to make soup, said soup stock being subject to deterioration upon exposure to air, and having a free water content sufficiently low as to normally preclude deterioration of the gelatin shell.

ROBERT P. SCHERER.